United States Patent
Gueron et al.

(10) Patent No.: US 8,468,365 B2
(45) Date of Patent: Jun. 18, 2013

(54) TWEAKABLE ENCRYPTION MODE FOR MEMORY ENCRYPTION WITH PROTECTION AGAINST REPLAY ATTACKS

(75) Inventors: Shay Gueron, Haifa (IL); Gideon Gerzon, Zichron Yaakov (IL); Ittai Anati, Haifa (IL); Jacob Doweck, Haifa (IL); Moshe Maor, Kiryat Mozking (IL)

(73) Assignee: Intel Corporation, Santa Clara, CA (US)

( * ) Notice: Subject to any disclaimer, the term of this patent is extended or adjusted under 35 U.S.C. 154(b) by 318 days.

(21) Appl. No.: 12/890,365

(22) Filed: Sep. 24, 2010

(65) Prior Publication Data
US 2012/0079285 A1  Mar. 29, 2012

(51) Int. Cl.
*G06F 21/00* (2006.01)
(52) U.S. Cl.
USPC .......... 713/190; 713/189
(58) Field of Classification Search
None
See application file for complete search history.

(56) References Cited

U.S. PATENT DOCUMENTS

| 7,681,050 | B2 | 3/2010 | Blom et al. |
| 2008/0066074 | A1 | 3/2008 | Nutter et al. |
| 2008/0270505 | A1* | 10/2008 | Bolotov et al. ............... 708/492 |
| 2009/0048976 | A1* | 2/2009 | Hars ............................... 705/50 |
| 2009/0187771 | A1 | 7/2009 | Mclellan, Jr. |
| 2011/0208979 | A1* | 8/2011 | Saarinehn et al. ............ 713/193 |
| 2011/0255689 | A1* | 10/2011 | Bolotov et al. ................ 380/42 |
| 2012/0226731 | A1* | 9/2012 | Gashkov et al. .............. 708/620 |

FOREIGN PATENT DOCUMENTS
WO  2012040679 A2  3/2012

OTHER PUBLICATIONS

International Search Report and Written Opinion Received for PCT Patent Application No. PCT/US2011/053170, mailed on Apr. 10, 2012, 9 pages.
Liskov et al., "Tweakable Block Ciphers", Proceedings of CRYPTO 2002 Advances in Cryptology—CRYPTO 2002, 22nd Annual International Cryptology Conference, Santa Barbara, California, USA, Aug. 18-22, 2002, Proceedings , Springer, pp. 31-46.
Dworkin, "Recommendation for Block Cipher Modes of Operation: The XTS-AES Mode for Confidentiality on Storage Devices", National Institute of Standards and Technology Special Publication 800-38E, Jan. 2010, 12 pages.

* cited by examiner

*Primary Examiner* — William Goodchild

(57) ABSTRACT

A method and apparatus for protecting against hardware attacks on system memory is provided. A mode of operation for block ciphers enhances the standard XTS-AES mode of operation to perform memory encryption by extending a tweak to include a "time stamp" indicator. An incrementing mechanism using the "time stamp" indicator generates a tweak which separates different contexts over different times such that the effect of "Type 2 replay attacks" is mitigated.

16 Claims, 7 Drawing Sheets

TWEAKABLE ENCRYPTION MODE FOR MEMORY ENCRYPTION WITH PROTECTION AGAINST REPLAY ATTACKS

FIELD

This disclosure relates to cryptographic protection of data and in particular to encryption of software applications stored in memory regions in a memory.

BACKGROUND

A region of volatile memory in a system that is used by secure software applications need to be protected from malicious modifications by unauthorized entities. These malicious modifications, also referred to as "attacks" may be software attacks or hardware attacks. One method to provide confidentiality and integrity protection for secure software applications is to integrate a large volatile memory in the Central Processing Unit (CPU) package, to be used as "private memory" by the secure software applications. However, the integration of a large volatile memory in the CPU package is expensive.

Thus, secure software applications are typically stored in external (that is, external to the CPU) memory. Memory regions (areas) in the external memory to store the secure software applications can be visible or invisible to the Operating System (OS) in the system. If these memory regions are visible to the OS, they need to be protected from software attacks. If these memory regions are not visible to the OS (called "stolen memory areas"), and there is some access control mechanism, they need to be protected from hardware attacks, that is, from an attacker that has physical access to external memory.

BRIEF DESCRIPTION OF THE DRAWINGS

Features of embodiments of the claimed subject matter will become apparent as the following detailed description proceeds, and upon reference to the drawings, in which like numerals depict like parts, and in which:

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

Figure 1:
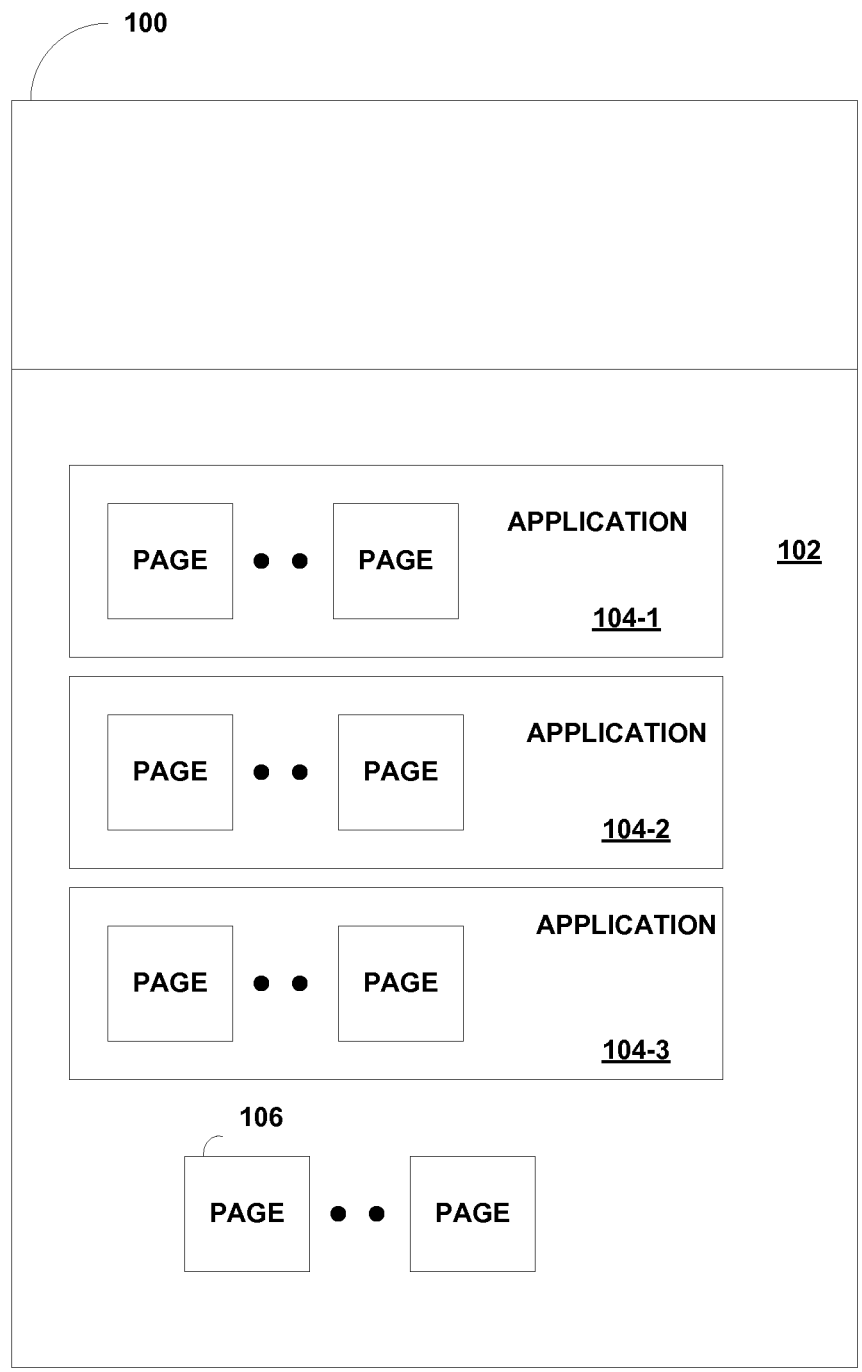
FIG. 1 illustrates a system memory that includes a stolen memory region.

FIG. 1 illustrates an embodiment of a system memory 100 that includes a stolen memory area 102. A stolen memory area 102 is a memory region (portion of memory) that is not visible to the Operating System (OS). The system memory 100 is "external" memory, that is, separate from a Central Processing Unit (CPU) in the system. The stolen memory area 102 includes a plurality of physical pages 106. Three software applications 104-1, 104-2, 104-3 reside inside memory regions spanning one or more physical pages 106 in the stolen memory area 102. Each software application 104-1, 104-2, 104-3 spans across multiple physical pages 106 of the stolen memory area 102 in the system (external) memory 100.

One method to protect a memory regions used by a secure software application is to encrypt the data that is stored in the memory regions in the system memory 100. The encryption and decryption of the data stored in the memory regions is performed in the CPU, using a key which is both generated and stored inside the CPU. However, encryption of the data by itself is designed to provide only confidentiality of the data. The encryption of the data stored in the memory regions helps protect confidentiality of the data from an attacker who can passively read the external memory, or can snoop the data as it is transferred between the CPU and the system memory 100.

However, encryption of the data stored in the memory regions in external memory 100 does not provide integrity checks. Storing the encrypted form of the data in memory regions in the stolen memory area 102 in the external memory 100 does not protect against an attacker who can actively modify or replay parts of the memory image stored in the stolen memory area 102 in the external memory 100.

A malicious attacker (adversary) can copy from one memory location in the external memory 100 and write to a different memory location in the external memory. For example, the attacker may copy the contents of page x at address a onto page y at address b. An adversary with read/write access to the encrypted memory region can perform a replay attack by observing when the encrypted memory region is modified (for example, at time 2 (t2)) and resetting the memory region by copying the contents of the encrypted region that was written at time 1 (t1). The attacker that performs a replay attack may have control of one of two different applications (contexts) that may reside at the same memory area at different times. For example, the attacker may be using one of the applications to attack the other application.

One method to mitigate replay attacks is to securely store authentication tags with the encrypted data in the external memory 100. However, this requires additional memory which is expensive.

An embodiment of the present invention mitigates replay attacks by reducing the effect of such attacks to no more than the ability to induce random (unpredictable and uncontrollable) changes to a memory image.

The XEX encryption mode with tweak and ciphertext stealing (XTS)-Advanced Encryption Standard (AES) Tweakable Block Cipher (IEEE Standard 1619-2007) is a mode of operation under National Institute of Standards and Technology (NIST) Federal Information Processing Standards (FIPS) 140-2 which defines elements of an architecture for cryptographically protecting data stored in constant length blocks. In an embodiment, a new mode of operation for block ciphers that enhances the standard XTS-AES mode of operation and a method and apparatus for implementing memory encryption while using the XTS-AES mode of operation for block ciphers is provided.

The XTS-AES mode of operation applies to encryption of a data stream divided into consecutive equal-size data units with the exception that the last data unit of the data stream may be smaller than the others. Each data unit has 128 or more bits of data within a key scope. The key scope is data encrypted by a particular key, divided into equal-sized data units. The key scope is identified by three non-negative integers: a tweak value corresponding to the first data unit, the data unit size, and the length of the data. The tweak value is a 128-bit value used to represent the logical position of the data in the data stream that is being encrypted or decrypted with XTS-AES. Each data unit is assigned a tweak value that is a non-negative integer. The tweak values are assigned consecutively starting with an arbitrary non-negative integer.

The XTS-AES mode of operation is a "tweakable narrow-block encryption", and is the standard mode for disk encryption (data-at-rest encryption). It can be viewed as encryption in Electronic Code Book (ECB) mode, where the encryption uses a tweak value (tweak) that modifies the encryption of a data block as a function of its "index" position. In ECB mode, each plaintext block is encrypted independently with the block cipher. For disk encryption, in the XTS-AES mode of operation, the tweak is used for binding the encryption to a sector on a disk drive (storage media) which is encrypted.

In an embodiment, a memory encryption unit uses the XTS-AES mode of operation for binding encryption to the (physical) memory address of a processed data block. Using AES-XTS helps, to a large extent, against an attacker who can physically manipulate the encrypted memory images, and attacks by swapping the positions of encrypted blocks, or by overwriting encrypted blocks with other encrypted blocks. As the AES-XTS tweak is a function of the physical memory address, such an attack becomes equivalent to the much weaker attack of inducing random changes that are unpredictable and uncontrollable by the attacker. In other words, the attacker does not gain from swapping/overwriting more than what the attacker can gain from "blindly" changing the memory.

However, as the XTS-AES tweak is a function of the physical address, it does not protect against a replay attack, where the attacker overwrites a block with an encrypted block that was previously written to the same address. To illustrate the potential severity of such attack, consider a software application that writes an encrypted image to page x in memory at a time 1 (t1). The attacker saves this encrypted image using hardware access to memory. Then, the attacker evicts that software application via software methods and loads a malicious software application to occupy the same memory regions. The attacker then physically replays the copy of the encrypted image to page x, and at that point, the malicious software application gains full ownership of the image. For example, the malicious software application can decrypt and dump the secrets as plaintext to any memory location it chooses. This attack can be mounted even if a finite number of keys are used by the CPU for the memory encryption unit because it only requires repeating the attack process enough times to exhaust key possibilities. Such attacks can be used to obtain any secret from the CPU, for example, Enhanced Privacy Identifier (EPID)) or from sensitive codes.

In the standard XTS mode for disk encryption, an AES-XTS of a data block P, whose index is (j) in a unit (u) is performed by first generating a tweak value and then generating ciphertext from the plaintext using the tweak value.

For example, a tweak value (X) is generated using a 16 byte key value (K1) on a block identifier (unit (u), the unit's position (j) in that unit (u)) and a polynomial (Poly) $x^{128}+x^7+x^2+x+1$ as shown below:

$$X=AES(K1,u)*2^j \bmod Poly \qquad \text{Equation 1}$$

where: "*" denotes carry-less multiplication

Having generated the tweak value (X), the ciphertext (C) is generated from the plaintext (P) using the tweak value (X) and another 16 byte key value (K2) as shown below:

$$C=AES(K2,P+X)+X \qquad \text{Equation 2}$$

AES-XTS reserves 64 bits (8 bytes) for the value of the unit (u). As the AES encryption operates on 16 byte blocks, the 64 remaining bits (8 bytes) of the block (16 Bytes) (="u") which are encrypted as shown in Equation 1, are defined as 0.

AES-XTS can be applied to memory encryption by defining a "unit" to be a 64 Byte cache line, and the index j=0, 1, 2, 3 to indicate the position of the 16 byte data block in that cache line. In this case, the value of "u" is the (physical) address of the cache line. Physical addresses are typically encoded using 48 bits.

In an embodiment of the present invention, a new mode of operation based on extending the standard AES-XTS mode, to use more information in the tweak (extended tweak) is provided. The extended tweak includes, in addition to the standard information, for example, cache line address and block position, a time stamp value. In another embodiment, the extended tweak includes, for example, the at least one additional label. In an embodiment, the additional label is a version number of a software application that is running in the system. The addition of the version number to the tweak prevents copying a cache line from an old version of the software application and replaying it at the same address on a newer version of the software application to gain a privilege of the newer version while running the old version.

In an embodiment, the bits in the extended tweak that store the additional information reside in the top (most significant) 64 bits of the extended tweak. As discussed earlier, the most significant bits are set to 0 in the standard AES-XTS mode. In anther embodiment, the additional information resides in other bits which are guaranteed to be zero. Thus, extended AES-XTS is a generalization of the standard AES-XTS because if all the additional information bits are degenerated to 0, the encryption is the standard XTS mode.

In one embodiment, the extended tweak is generated as shown below in Equation 3:

$$X=AES(K1,L|T|u)*2j \bmod Poly \text{ Equation} \qquad 3$$

Where P is a data block, whose index is j, in the unit u, encrypted at time indicated by T, and having a label L and the symbol "|" denotes concatenation.

In another embodiment, a label is not used and the extended tweak is generated using cache line address and time. The extended tweak is generated such that the tweak describes consecutive integers, counting addresses of a region at time 0, 1, . . . , 2^(32)–1).

The tweak for CL [j] (at time TIME) (with j=0, 1, 2, . . . , m−1, and TIME=0, 1, 2, . . . 2^(32)−1) is:

TWEAK=00 . . . 0[127: 55]|(ACL [j]>>6) [33: n+14]|TIME [31:0]|(ACL [j]>>6) [n+13:0]

where: Unit=Cache Line (CL);
  each CL is 2^(6)=64 bytes which is (4×128-bit (2^(20)) blocks);
  each CL has a 40-bit base-address, ACL [39:0] with ACL [5:0]=[000000]; a partition has 2^n MB;
  m (the number of CL's in the partition)=2^(n+14);
  j is one of m CLs in a datastream;
the data stream is the m CL's, at different times, namely CL [j] (at time t), as follows:

$CL[0], CL[1], \ldots, CL[m-1]$ at time $t = 0$ $CL[0], CL[1], \ldots, CL[m-1]$ at time $t = 1$

...

$CL[0], CL[1], \ldots, CL[m-1]$ at time $t = 2^{\wedge}(32) - 1$ and the base-address for CL [j] is denoted by ACL [j] (where j=0, 1, 2, ..., m−1).

When going over the CL's (units) of the data stream (in the order specified above), the TWEAK runs consecutively over all the positive integers starting from the positive integer
00 . . . 0[127:55]|(ACL[0]>>6)[33: n+14]|00 . . . 0[31:0]| (ACL[0]>>6) [n+13:0]
and ending with
00 . . . 0[127:55]|(ACL[m−1]>>6)[33: n+14]|11 . . . 1[31: 0]|(ACL[m−1]>>6) [n+13:0]
For, example:
Consider a 2 MB partition, with n=1, and m=15.
The tweak for CL [j] at time TIME (32 bits) is defined as follows
00 . . . 0[127: 55]|(ACL[j]>>6) [33:15]|TIME [31:0]|(ACL [j]>>6) [14:0]

Figure 2A:
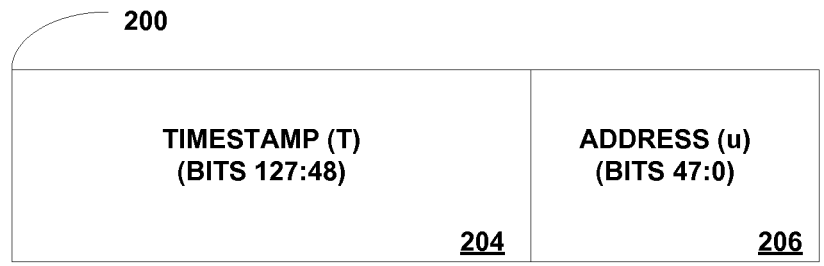
FIG. 2A illustrates one embodiment of an extended tweak.

FIG. 2A illustrates one embodiment of an extended tweak 200. The extended tweak 200 shown in FIG. 2A is a 128-bit value. The least significant 48 bits (Bits 47:0) 206 of the extended tweak 200 are reserved for the address (u) and the remaining 80 Most Significant bits (Bits 127:48) 204 are reserved for the time stamp (T).

Figure 2B:
FIG. 2B illustrates another embodiment of an extended tweak.

FIG. 2B illustrates another embodiment of an extended tweak 202. In the embodiment of the extended tweak 202 shown in FIG. 2B, the least significant 64 [bits 63:0] bits of the extended tweak 202 are reserved for the address (u) 212, the next 32 bits [bits 95:64] for the time stamp (T) 210 and the most significant 32 [bits 127:96] bits for a label (L) 208.

To decrypt a block encrypted with the embodiment of extended AES-XTS shown in FIG. 2B, requires the ciphertext C, the address u, the index j, and also the time stamp T and the label L. In an embodiment, the value of the timestamp (T) and label (L) is not secret, but it is stored in a trusted way.

The advantage of the extended AES-XTS tweak is the following "time isolation" property: if ciphertext C, which was encrypted in time t1 to address A1, is replayed on address A1, but decrypted at time t2, it is decrypted into an unpredictable string, because the tweak values differ due to the different time stamp values.

This "time isolation" property protects against Type 2 replay attack, because the attacker does not get from "replaying to the same address" more than whatever the attacker could get from a random (unpredictable and uncontrollable) change of the memory image. Similarly, the extended AES-XTX tweak mode also achieves isolation between contexts that are distinguished by their label (L).

An embodiment has been described for XTS-AES, however the extended tweak mode is not limited to XTS-AES and can be applied in other embodiments to other tweakable encryption schemes. For example, in an embodiment for the LRW(M. Liskov, R. Rivest, and D. Wagner) tweakable block cipher, LRW can be enhanced to an enhanced LRW mode in an analogous way.

Figure 3:
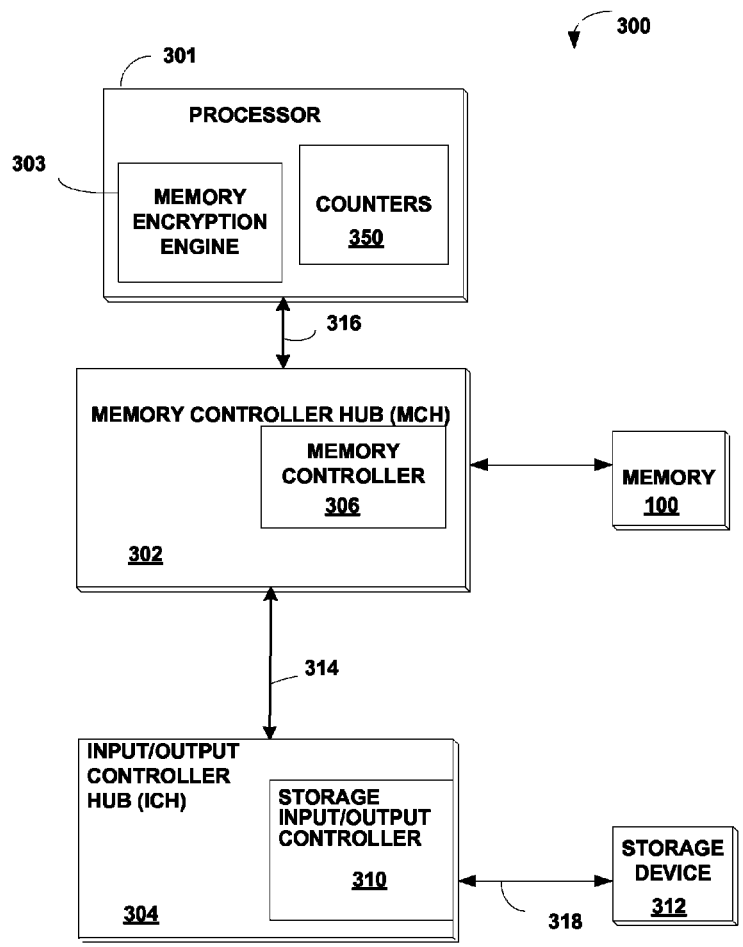
FIG. 3 is a block diagram of a system that includes a memory encryption engine for performing memory encryption.

FIG. 3 is a block diagram of a system 300 that includes a memory encryption engine 303 for performing memory encryption. The system 300 includes a processor 301, a Memory Controller Hub (MCH) 302 and an Input/Output (I/O) Controller Hub (ICH) 304. The MCH 302 includes a memory controller 306 that controls communication between the processor 301 and external memory 100. The processor 301 and MCH 302 communicate over a system bus 316.

The processor 301 may be any one of a plurality of processors such as a single core Intel® Pentium IV® processor, a single core Intel Celeron processor, an Intel® XScale processor or a multi-core processor such as Intel® Pentium D, Intel® Xeon® processor, or Intel® Core® Duo processor or any other type of processor.

The memory encryption engine 303 in the processor 301 may perform encryption and decryption on data that may be stored in memory 100 and/or stored in the storage device 312. The memory encryption engine 303 provides confidentiality against a passive attacker who can read the contents of the memory 308. The memory encryption engine 303 also provides protection against an active attacker who can read and write memory regions in memory at a granularity of 16 bytes with a cipher that operates on 16 bytes and a cache line in the memory 308 has 64 bytes. For example, if one bit in a 16 byte segment in the 64 byte cache line is modified, the 16 byte segment is "random" and unpredictable to the attacker.

The memory 100 may be Dynamic Random Access Memory (DRAM), Static Random Access Memory (SRAM), Synchronized Dynamic Random Access Memory (SDRAM), Double Data Rate 2 (DDR2) RAM or Rambus Dynamic Random Access Memory (RDRAM) or any other type of memory.

The ICH 304 may be coupled to the MCH 302 using a high speed chip-to-chip interconnect 314 such as Direct Media Interface (DMI). DMI supports 2 Gigabit/second concurrent transfer rates via two unidirectional lanes.

The ICH 304 may include a storage I/O controller 310 for controlling communication with at least one storage device 312 coupled to the ICH 304. The storage device may be, for example, a disk drive, Digital Video Disk (DVD) drive, Compact Disk (CD) drive, Redundant Array of Independent Disks (RAID), tape drive or other storage device. The ICH 304 may communicate with the storage device 312 over a storage protocol interconnect 318 using a serial storage protocol such as, Serial Attached Small Computer System Interface (SAS) or Serial Advanced Technology Attachment (SATA).

An embodiment will be described for protection of an address range in memory 100.

Figure 4:
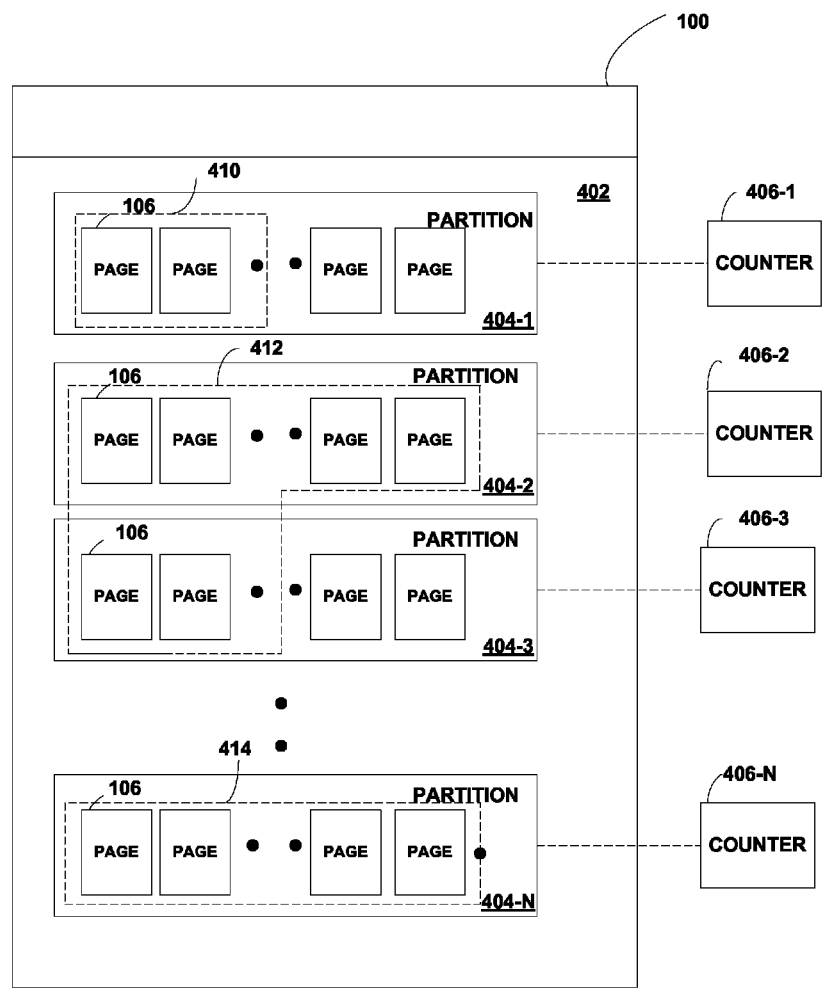
FIG. 4 is a block diagram of a portion of a memory region in the external memory shown in FIG. 3 to store data to be encrypted.

FIG. 4 is a block diagram of a portion of a memory region 402 in the external memory 100 shown in FIG. 3 to store encrypted data. The memory region 402 is logically divided into N "partitions". Returning to FIG. 3, there are N counters 350 in the processor 301, one counter per logical partition in the portion of the memory region 402 shown in FIG. 4.

Figure 5:
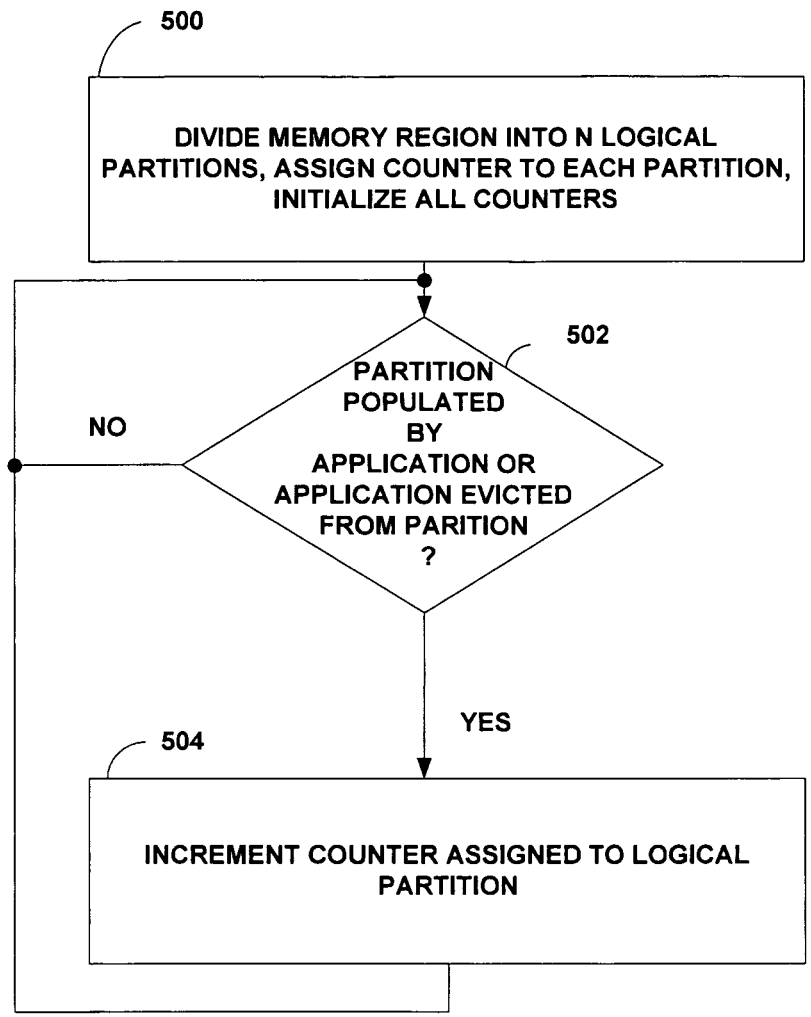
FIG. 5 illustrates a method for use of the partitions in the portion of the memory region in external memory shown in FIG. 4 by applications.

FIG. 5 illustrates a method for use of the partitions in the portion of the memory region 402 in external memory 100 shown in FIG. 4 by applications. FIG. 5 is described in conjunction with FIG. 4.

At block 500, the portion of the memory region 402 is divided into N partitions 404-1, . . . , 404-N. A counter 406-1, . . . , 406-N is assigned to each partition 404-1, . . . , 404-N. All of the counters 406-1, . . . , 406-N are initially reset to 0. Processing continues with block 502.

At block 502, when a software application is stored in (written to) memory 100, the software application 410, 412, 414 populates one or more cache lines in one or more logical partitions 404-1, . . . , 404-N. In an embodiment, each cache line has 64 bytes and the operating system operates at the granularity of a memory page, which may be 4096 bytes. If an application is loaded into memory 100, processing continues with block 504. If an application that has been loaded to memory 100 is evicted, and another application (possibly malicious) is loaded into the same address space, processing continues with block 504. If not, processing continues with block 502.

At block 504, whenever a partition 404-1, . . . , 404-N is populated for the first time (by some cache line), the corresponding counter 406-1, . . . , 406-N for that partition is incremented by the processor. In addition, the counter value(s) of the corresponding partition(s) 404-1, . . . 404-N are incremented automatically by the processor as part of the eviction and/or loading procedure. Processing continues with block 502.

Returning to FIG. 4, over different times, each application 410, 412, 414 is placed in logical partitions 404-1, . . . 404-N that have a different counter value which can differ across the logical partitions populated by that application. A memory encryption engine 303 in the processor 301 implements the XTS-AES enhanced tweak mode of operation where T is the counter value, u is the physical address, and j is the block's index. In this way, the tweak value (X) is bounded not only to the address of the logical partition in the memory, but also to the counter value which the CPU stored at the time that the application 410, 412, 414 was loaded in memory 100.

The "counter" and the method in which it is initialized and incremented may vary. In an embodiment, a counter can be a linear feedback shift register (LFSR), which is initialized to a nonzero value that is fixed or randomized and incremented using a clock input. In another embodiment, a counter can be a register including incrementing logic which is initialized either randomly or deterministically. In yet another embodiment, a counter can be a value which is sampled from a random bit generator. The length (number of output bits) of the counter can determined in such a way that trying to replay a copied image at the same counter value, is impractical.

In the example shown in FIG. 4, there are three applications 410, 412, 414 that are stored in different partitions 404-1, . . . , 404-N of the memory 100, such that no two applications 410, 412, 414 are stored in the same partition 404-1, . . . , 404-N. Each logical partition 404-1, . . . 404-N is assigned a different counter. Application 412 uses pages in two partitions 404-2, 404-3, each of these partitions has a respective counter 406-2, 406-3. Decryption of the application stored in the logical partitions works correctly if the counter inside the processor that is assigned to the application is not incremented. The counter value is not incremented unless the application is first evicted from the respective partition.

When an application is evicted, and another application (possibly malicious) is loaded into the same address space, the counter value(s) of the corresponding partition(s) are incremented automatically by the CPU as part of the eviction and/or loading procedure. In a Type 2 attack, an attacker copies a memory image that belongs to a previous application, and replays it to the same addresses, while the attack code is populating the relevant memory area. This attack succeeds if the memory is encrypted with the standard XTS-AES encryption, and the attacker can read secrets stored in the memory image. However, with the XTS-AES enhanced tweak mode, the attacker does not get a result because the counter value does not match. The use of the counter value is better than random modification, because the XTS-AES enhanced tweak uses a different counter value in the decryption.

An advantage is that the method uses only encryption, with a tweak, and the memory reads and writes translate to a single memory access. Furthermore, the number of partitions can be determined by the implementation, as a tradeoff between additional hardware cost for counters and memory-utilization efficiency that is more partitions provide better granularity.

Figure 6:
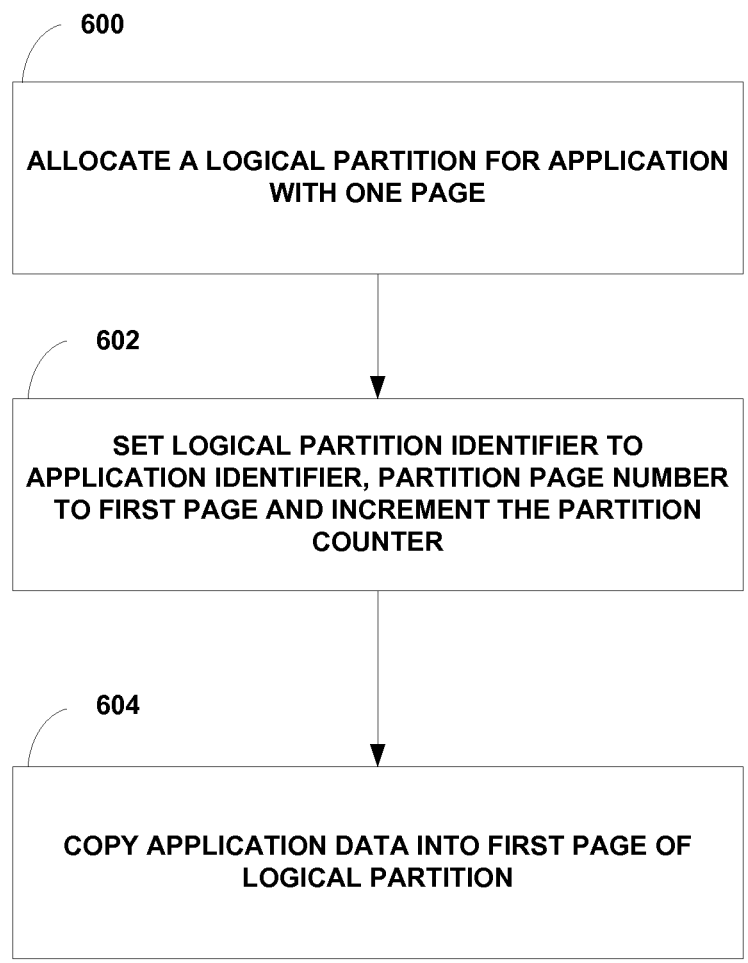
FIG. 6 illustrates an embodiment of a method to store a trusted application in memory.

FIG. 6 illustrates an embodiment of a method to store a trusted application in memory. Trusted applications are first initialized, and then request memory allocation for themselves, in the form of asking for additional physical pages.

At block 600, an application to be stored in memory is received. The received application is associated with an application identifier and includes the first page of the application. A logical partition is allocated for the application. Processing continues with block 602.

At block 602, the identifier of the application is stored in a logical partition identifier associated with the allocated logical partition is set to the identifier of the application. A page number associated with the allocated logical partition is stored in a page number associated with the allocated logical partition. The partition counter associated with allocated logical partition is incremented. Processing continues with block 604.

At block 604, data in the first page of the application is stored in the first page of the allocated logical partition.

Figure 7:
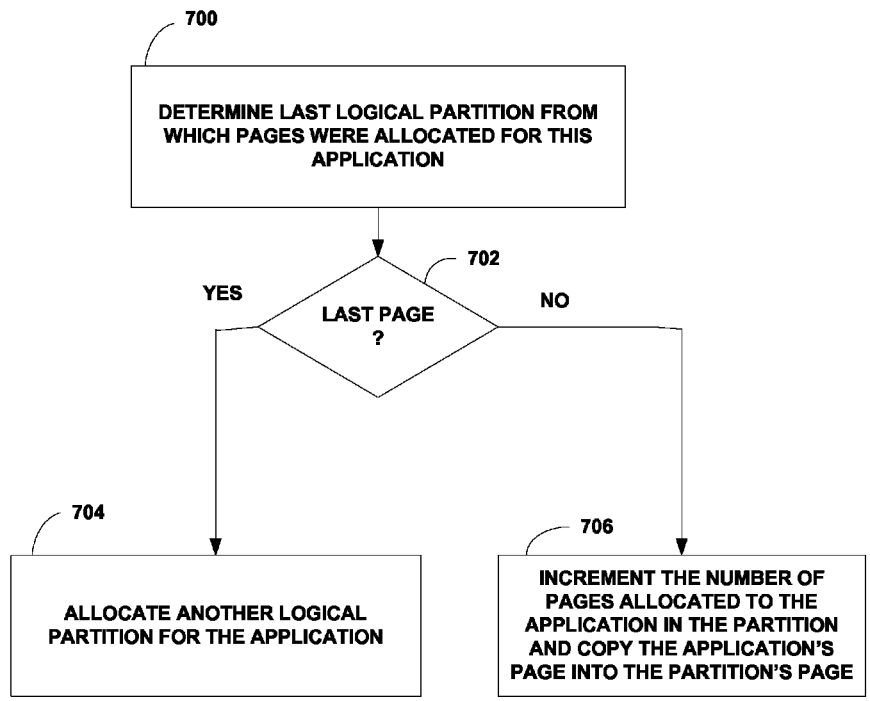
FIG. 7 illustrates an embodiment of a method to add additional allocation of memory to a trusted application.

FIG. 7 illustrates an embodiment of a method to add additional allocation of page(s) of memory to a trusted application.

At block 700, upon receiving a request to store data in memory for an application, the last logical partition from which pages were allocated for this application is determined. Processing continues with block 702.

At block 702, if the current page number is the last page in the allocated logical partition, processing continues with block 704. If not, processing continues with block 706.

At block 704, as the current page is the last page of the current allocated logical partition for the application, another logical partition is allocated for the application and the page of the application is copied into the first page of the newly allocated logical partition.

At block 706, as the current page is not the last page of the current allocated logical partition for the application, the number of pages allocated to the application in the current logical partition is incremented to the next page and the page of the application is copied into the next page of the current allocated logical partition.

It will be apparent to those of ordinary skill in the art that methods involved in embodiments of the present invention may be embodied in a computer program product that includes a computer usable medium. For example, such a computer usable medium may consist of a read only memory device, such as a Compact Disk Read Only Memory (CD ROM) disk or conventional ROM devices, or a computer diskette, having a computer readable program code stored thereon.

While embodiments of the invention have been particularly shown and described with references to embodiments thereof, it will be understood by those skilled in the art that various changes in form and details may be made therein without departing from the scope of embodiments of the invention encompassed by the appended claims.

The invention claimed is:

1. A method comprising:
   dividing, by a processor, a memory separate from the processor into a plurality of logical partitions, each for storing one of a plurality of blocks of data associated with an application;
   allocating a plurality of counters in the processor, each for one of the logical partitions, wherein each of the counters stores a timestamp value associated with its allocated one of the logical partitions, the timestamp value being incremented autonomously in the processor whenever data is written into or read from its allocated logical partition;

encrypting, by the processor, a first block of data associated with the application and to be stored in a first logical partition of the logical partitions, the first block of data being encrypted using a tweak that includes a cache line identifier of the memory, a position in the identified cache line of the first block of data to be encrypted, and the timestamp value of the allocated counter of the first logical partition; and storing the encrypted block of data in the first logical partition.

2. The method of claim 1,
wherein the tweak further comprises a label indicating version number of the application.

3. The method of claim 1, wherein the application is a secure application.

4. The method of claim 1, wherein the tweak is an XTS-AES tweak.

5. The method of claim 1, wherein the tweak is a LRW tweak.

6. An apparatus comprising:
a first logic, in a processor, to divide a memory separate from the processor into a plurality of logical partitions, each for storing one of a plurality of blocks of data associated with an application;

a second logic in the processor to allocate a plurality of counters in the processor, each for one of the logical partitions, wherein each of the counters stores a timestamp value associated with its allocated one of the logical partitions, the timestamp value being incremented autonomously in the processor whenever data is written into or read from its allocated logical partition;

a third logic in the processor to encrypt a first block of data associated with the application and to be stored in a first logical partition of the logical partitions, the first block of data being encrypted using a tweak that includes a cache line identifier of the memory, a position in the identified cache line of the first block of data to be encrypted, and the timestamp value of the allocated counter of the first logical partition; and a fourth logic to store the encrypted block of data in the first logical partition.

7. The apparatus of claim 6, wherein the tweak further comprises a label indicating version number of the application.

8. The apparatus of claim 6, wherein the application is a secure application.

9. The apparatus of claim 6, wherein the tweak is an XTS-AES tweak.

10. The apparatus of claim 6, wherein the tweak is a LRW tweak.

11. An article including a non-transitory machine-accessible medium having associated information, wherein the information, when accessed, results in a machine performing:

dividing, by a processor, a memory separate from the processor into a plurality of logical partitions, each for storing one of a plurality of blocks of data associated with an application;

allocating a plurality of counters in the processor, each for one of the logical partitions, wherein each of the counters stores a timestamp value associated with its allocated one of the logical partitions, the timestamp value being incremented autonomously in the processor whenever data is written into or read from its allocated logical partition;

encrypting, by the processor, a first block of data associated with the application and to be stored in a first logical partition of the logical partitions, the first block of data being encrypted using a tweak that includes a cache line identifier of the memory, a position in the identified cache line of the first block of data to be encrypted, and the timestamp value of the allocated counter of the first logical partition; and storing the encrypted block of data in the first logical partition.

12. The article of claim 11,
wherein the tweak further comprises a label indicating version number of the application.

13. The article of claim 11, wherein the tweak is one of an XTS-AES tweak and a LRW tweak.

14. A system comprising:
a mass storage device to store an application; and
a processor comprising:
a first logic to divide a memory separate from the processor into a plurality of logical partitions, each for storing one of a plurality of blocks of data associated with the application;

a second logic in the processor to allocate a plurality of counters in the processor, each for one of the logical partitions, wherein each of the counters stores a timestamp value associated with its allocated one of the logical partitions, the timestamp value being incremented autonomously in the processor whenever data is written into or read from its allocated logical partition;

a third logic to encrypt a first block of data associated with the application to be stored in a first logical partition of the logical partitions, the first block of data being encrypted using a tweak that includes a cache line identifier of the memory, a position in the identified cache line of the first block of data to be encrypted, and the timestamp value of the allocated counter of the first logical partition; and a fourth logic to store the encrypted block of data in the first logical partition.

15. The system of claim 14, wherein the tweak further comprises a label indicating version number of the application.

16. The system of claim 15, wherein the tweak is one of an XTS-AES tweak and a LRW tweak.

* * * * *

UNITED STATES PATENT AND TRADEMARK OFFICE
CERTIFICATE OF CORRECTION

| | |
|---|---|
| PATENT NO. | : 8,468,365 B2 |
| APPLICATION NO. | : 12/890365 |
| DATED | : June 18, 2013 |
| INVENTOR(S) | : Shay Gueron et al. |

It is certified that error appears in the above-identified patent and that said Letters Patent is hereby corrected as shown below:

On the Title page, in item (75), in column 1, in "Inventors", line 4, delete "Mozking" and insert -- Motzkin --, therefor.

In the Drawings:
On sheet 5 of 7, in Figure 5, Reference Numeral 502, line 6, delete "PARITION" and insert -- PARTITION --, therefor.

Signed and Sealed this
Eighth Day of October, 2013

Teresa Stanek Rea
*Deputy Director of the United States Patent and Trademark Office*